United States Patent [19]

Stoffel et al.

[11] Patent Number: 4,994,110

[45] Date of Patent: * Feb. 19, 1991

[54] DYES CONTAINING LITHIUM FOR INK-JET PRINTING INKS

[75] Inventors: John L. Stoffel; Ronald A. Askeland, both of San Diego; William D. Kappele, San Marcos, all of Calif.

[73] Assignee: Hewlett-Packard Company, Palo Alto, Calif.

[ * ] Notice: The portion of the term of this patent subsequent to Aug. 2, 2005 has been disclaimed.

[21] Appl. No.: 455,465

[22] Filed: Dec. 22, 1989

Related U.S. Application Data

[63] Continuation-in-part of Ser. No. 223,322, Jul. 25, 1988, abandoned, which is a continuation-in-part of Ser. No. 11,186, Jul. 5, 1987, abandoned, which is a continuation-in-part of Ser. No. 900,664, Aug. 27, 1986, abandoned.

[51] Int. Cl.$^5$ ............................................. C09D 11/02
[52] U.S. Cl. ........................................ 106/22; 106/20; 523/160
[58] Field of Search ................... 106/20, 22; 523/160

[56] References Cited

U.S. PATENT DOCUMENTS

| | | | |
|---|---|---|---|
| 4,426,226 | 1/1984 | Ohta et al. | 106/22 |
| 4,500,355 | 2/1985 | Shimada et al. | 106/22 |
| 4,557,761 | 12/1985 | Kobayashi et al. | 106/22 |
| 4,585,484 | 4/1986 | Haruta et al. | 106/22 |
| 4,620,875 | 12/1986 | Shimada et al. | 106/22 |
| 4,631,085 | 12/1986 | Kawanishi et al. | 106/22 |
| 4,636,410 | 1/1987 | Akiya et al. | 427/261 |
| 4,666,519 | 5/1987 | Akiyama et al. | 106/22 |
| 4,761,180 | 8/1988 | Askeland et al. | 106/22 |
| 4,786,327 | 11/1988 | Wenzel et al. | 106/22 |
| 4,793,860 | 12/1988 | Murakami et al. | 106/22 |
| 4,810,292 | 3/1989 | Palmer et al. | 106/22 |

FOREIGN PATENT DOCUMENTS 0202358 12/1982 Japan.
0073772 4/1986 Japan.

*Primary Examiner*—William R. Dixon, Jr.
*Assistant Examiner*—Helene Klemanski

[57] ABSTRACT

Inks used in ink-jet printing comprise a vehicle and a dye. The vehicle consists essentially of about 5 to 10 wt % of a glycol and/or glycol ether and the balance water. The dye is typically an anionic dye, associated with undesirable cations such as sodium or potassium cations. Several properties of such inks are improved by replacing substantially all of said cations on the anionic dye with lithium cations and removing such cations, preferably to leave a maximum concentration of such cations of less than about 500 ppm, and most preferably less than about 350 ppm.

20 Claims, No Drawings

DYES CONTAINING LITHIUM FOR INK-JET PRINTING INKS

CROSS-REFERENCE TO RELATED APPLICATIONS

The present application is a continuation-in-part application of application Ser. No. 0.7/223,322, filed July 25, 1988, which in turn is a continuation-in-part application of application Ser. No. 07/011,186, filed July 5, 1987, now abandoned, which in turn is a continuation-in-part application of application Ser. No. 06/900,664, filed Aug. 27, 1986, now abandoned.

TECHNICAL FIELD

The present invention relates to ink compositions for ink-jet printers, and, more particularly, to ink compositions in which the solubility of the dye is increased by replacement of cations such as sodium and potassium.

BACKGROUND ART

The use of aqueous-based inks for ink-jet printers is well-known. Such compositions are relatively inexpensive and easy to prepare; typically, the ink comprises water and a glycol or glycol ether, usually diethylene glycol (commonly referred to as the vehicle), and a dye. Typically, the water and glycol ether are present in generally the same proportion and the dye, for example, Food Black 2, is present up to about 6% of the total composition, depending on the desired density of the print.

The prior art inks generally use existing commercial dye salts (cation plus dye anion) as formed, which are simply dissolved in the vehicle and filtered to prepare the ink. Such dyes, which generally contain a plurality of sulfonate or carboxylate anion groups, are designed to form solids in paper or cloth, employing cations such as sodium cations. Consequently, the dyes do not easily remain liquid in the orifice of an ink-jet printer.

Thus, a persistent problem associated with aqueous-based inks is their propensity to crust over a period of time, eventually leading to plugging of the orifice in the printer mechanism from which droplets of ink are expelled in the printing operation. Crusting is the crystallization of the ink around the orifice in the print head, causing partial or full blockage of the orifice, leading to misdirection of the drop (partial blockage) or prevention of drop ejection (full blockage). The crusting problem arises from the evaporation of the water from the ink solvent (vehicle) and the consequent precipitation of the dye salt which has become substantially insoluble as a result of this water loss.

Attempts have been made to solve the crusting problem. Hygroscopic agents have been added to reduce the rate of water evaporation by their ability to pick up water vapor from the air. Exemplary of such hygroscopic agents are water-soluble polymers, alkanol amines, amides and polyhydric alcohols.

While some improvement has been realized with these hygroscopic agents, a total solution to the crusting problems has not yet been achieved. Further, apparently no methods are known to prevent crusting of the anionic dyes in mildly acidic to mildly basic aqueous-based inks (pH 4 to 9). Such crusting is particularly exacerbated by the trend to fabricate printheads with increasingly smaller orifices, on the order of 45 to 60 $\mu$m in diameter.

Attempts are continuing to develop inks in which the dye solubility is increased.

Other approaches include developing new dyes for inkjet inks. For example, U.S. Pat. No. 4,557,761 discloses a variety of sulfonate-containing dyes with cations such as sodium, potassium, lithium, ammonium and amine salt cations.

However, as shown above, dyes with sodium cations have certain deficiencies. Dyes with potassium cations also suffer from certain deficiencies, notably evidencing crusting. Dyes with ammonium cations, on the other hand, are not stable. Thus, the cations listed in U.S. Pat. No. 4,557,761 cannot be considered to be equivalent.

Finally, many cations are not suitable for dyes employed in inks used in thermal ink-jet printing. In this instance, a problem known as kogation may occur. Kogation is a coined term, unique to thermal ink-jet printing, and describes the extent of decomposition of the ink on the resistors of thermal ink-jet printers as a consequence of heating. Such heating is used to form droplets of ink, which are propelled toward the substrate.

While sodium-containing dyes evidence crusting problems, they also evidence superior kogation properties. Dyes containing other cations which evidence improved crusting also often evidence poor kogation.

It is known to partially replace sodium cations with lithium cations; see, e.g., Japanese Laid-Open 61-73772 (Applicant: Mitsubishi Kasei kagaku) and Japanese Laid-Open 57-202358 (Applicant: Fujitsu). However, such partial replacement has been found inadequate in dealing with the crusting problem, especially for the smaller orifice sizes on the order of 45 $\mu$m. Further, Japanese 57-202358 extols the use of a vehicle having about 25 to 35% water, the balance glycol. Inks employing such vehicles, however, are not suitable for printing on plain paper.

DISCLOSURE OF INVENTION

Accordingly, it is an advantage of the present invention to provide an ink composition evidencing increased dye solubility in the vehicle.

It is an advantage of this invention to provide an ink in which the crusting problem is minimal.

It is another advantage of this invention to provide an aqueous-based ink for ink-jet printers in which kogation of the dye in the ink solvent (vehicle) is not adversely affected by partial or total replacement of sodium or other cations.

It is a further advantage of this invention to provide an aqueous-based ink for ink-jet printers in which the solubility of anionic dyes in mildly acidic to mildly basic media is increased.

It is still another advantage of this invention to provide an aqueous-based ink for thermal ink-jet printers for printing on plain papers.

Briefly, the ink composition of the invention comprises a vehicle and an anionic dye containing a plurality of undesirable cations associated with each dye molecule, substantially all of the cations being replaced by lithium cations. The vehicle consists essentially of about 5 to 10% of at least one glycol and/or glycol ether and the balance water.

The dye containing lithium cations evidences increased solubility and reduced crusting in inks commonly used in ink-jet printing, yet shows no tendency toward kogation in ink-jet printing. The low glycol ink is suitably employed in thermal ink-jet printing on plain paper.

BEST MODES FOR CARRYING OUT THE INVENTION

The ink compositions of the invention comprise an aqueous-based vehicle and a dye. The pH of the ink may be maintained in both the mildly acidic and mildly basic regions, ranging from about 4 to 9. In this connection, pH buffers, biocides, and other components commonly found in ink-jet inks may be employed in the practice of the invention.

The vehicle of the ink comprises water and at least one of the glycols and glycol ethers commonly employed in the inks used in ink-jet printing. Examples of such compounds include diethylene glycol, triethylene glycol and polyethylene glycols. The glycol and/or glycol ether is present in an amount ranging from about 5 to 10%, the balance being water. Preferably, the vehicle comprises less than about 10% of the glycol and/or glycol ether, and most preferably comprises about 5.5% a glycol ether such as diethylene glycol and the balance water.

To the vehicle is added up to about 0.1 Molar of a dye, preferably an anionic dye. The amount of the dye added is a function of choice, being largely dependent upon the solubility of the dye in the vehicle (which limits the upper range of dye concentration) and the desired density of the print achieved with the ink (which limits the lower range of dye concentration—typically about 0.005 Molar). Preferably, the concentration of the dye in the ink composition is about 0.065 Molar. For Food Black 2, a dye commonly employed in ink-jet inks, the corresponding concentration in wt % ranges from about 0.5 to 10%, with about 6% being preferred.

The dye to which the invention is suitably applied is an organic molecule having at least one negatively charged functional group per molecule. Since sulfonate ($SO_3^-$), and carboxylate ($CO_3^-$), groups are especially benefited from the practice of the invention, dyes having such groups are preferred. An example of a preferred dye in this regard is Food Black 2 (FB2), which has a mixture of two, three and four sulfonate group per molecule. (The effective value is about 3.2 sulfonate groups per molecule for commercially available FB2.)

In commercially-prepared dyes, the negative charge of the sulfonate group in FB2 is most commonly balanced by the presence of positively charged sodium ($Na^+$). However, other cations, such as potassium, ammonium, etc., may be present.

Other anionic dyes in addition to FB2 may also be suitably employed in the practice of the invention, since, as will be discussed in further detail below, the solubility of the anionic dyes is increased in acidic media by employing the teachings of the invention. Examples of other anionic dyes which may be employed in the ink composition disclosed herein include Direct Red 9, Direct Red 227, Acid Yellow 23, Direct Yellow 86, Acid Blue 9, Direct Blue 86, Direct Blue 199 and Acid Blue 185.

In accordance with the invention, an ink composition suitable for use in ink-jet printers is provided, comprising:

(a) a vehicle comprising about 5 to 10% at least one glycol and/or glycol ether and the balance water; and (b) a dye having at least one negatively charged functional group per molecule, present in an amount up to about 0.1 Molar of the ink composition, the dye having a plurality of anionic sites, originally associated with undesirable cations, substantially all of the undesirable cations being replaced with lithium cations.

While sodium and potassium are considered examples of such undesirable cations, there may be other cations associated with the dye as obtained from a dye manufacturer which may beneficially be replaced in accordance with the teachings of this invention. All such replaceable cations are considered herein to be undesirable cations.

The presence of lithium cations increases the solubility of the dye in the vehicle without adversely affecting kogation in thermal ink-jet printers. The presence of lithium also reduces crusting of the ink around the orifices of the ink-jet printer, such crusting being caused by evaporation of the water in the vehicle of the ink upon exposure to air.

The substantially complete replacement of undesirable cations by lithium cations may be accomplished by a variety of methods, exemplary of which are ion exchange and reverse osmosis.

In the ion exchange reaction, the dye with undesirable cations, such as sodium cations, is passed through an acid-loaded ion exchange resin. The undesirable cations are replaced with hydrogen cations. The ion-exchanged dye is then reacted with lithium hydroxide (LiOH). The lithium cations replace the hydrogen cations, which react with the hydroxide anions to form water.

Substantially all of the undesirable cations are replace by the lithium cations in order to obtain substantial improvements in the properties described. Specifically, the sodium concentration must be maintained below about 500 ppm, and preferably below about 350 ppm, in order to avoid crusting of the orifices during the lifetime of the printhead.

It has been observed that the more the lithium replacement for sodium, the better the color density achievable.

The presence of lithium permits a concentration of dye up to about 0.1 Molar. Above this level, the viscosity of the ink is undesirably high. For practical purposes and economy, the maximum amount of Li-dye is about 0.065 Molar; above this level, the color density increases only very slowly.

An excess of lithium, about 5 to 10%, may be present in the ink to provide the manufacturer with a margin when making the lithium form of the dye.

INDUSTRIAL APPLICABILITY

The Li-substituted dyes provided in accordance with the invention find use in inks used in ink-jet printing, particularly in thermal ink-jet printing.

EXAMPLES

Example 1

A series of dyes were prepared, employing food Black 2, which originally had all anionic sites complexed with sodium cations. The vehicle comprised diethylene glycol (DEG) and water in the concentrations given below. In the inks listed in Table I below, the dye concentration is given in terms of millimolarity (mM). Comparisons are made with substitutions of sodium cations ranging from no replacement to full replacement by lithium (Li) cations. For comparison, full replacement by ammonium cations (NH4) and potassium cations (K) is also given.

TABLE I.

| Sample | Cation | % Na Replacement | Concentration, mM |
|--------|--------|------------------|-------------------|
| 1 | Na | — | 39 |
| 2 | Li | 100 | 39 |
| 3 | Li | 100 | 52 |
| 4 | Li | 100 | 65 |
| 5 | NH4 | 100 | 39 |
| 6 | K | 100 | 39 |

The properties of solubility, crusting, kogation, storage and change in color density ($\Delta E$) are listed in Table II below. The solubility is shown for two vehicle concentrations: 50/50 DEG/H$_2$O and 90/10 DEG/H$_2$O.

Storage refers to the stability of chemical and physical properties during storage.

$\Delta E$ is a measure of color density. If the color is measured in CIELAB coordinates, then $\Delta E$ is given by $$\Delta E = [(L_2-L_1)^2 + (a_2-a_1)^2 + (b_2-b_1)^2]^{\frac{1}{2}}$$

where L, a and b are coordinates of reference in CIELAB space and 1 refers to the background media and 2 refers to the sample.

TABLE II.

| Sample | Solubility 50/50 | Solubility 90/10 | Crusting | Kogation | Storage | $\Delta E$ |
|--------|------|-------|----------|----------|---------|------------|
| 1 | F | F | P | G | G | F |
| 2 | E | E | E | G | G | F |
| 3 | E | E | E | | | E |
| 4 | E | E | E | G | | E |
| 5 | | | | | P | |
| 5 | | | P | | | F |

The foregoing relative observations were based on the following scale, with the definitions of each observation for each property as follows:

E = Excellent
G = Good
F = Fair
P = Poor.

A perusal of Table II above shows that solubility is enhanced in both 50/50 DEG/H$_2$O and 90/10 DEG/H$_2$O for replacement of sodium cations by lithium cations. Further, kogation is not adversely affected by such replacement. Other properties of the inks containing Li-replaced dyes, such as crusting, storage and print quality are seen to be at least equivalent to those of inks containing sodium cations. Finally, comparison with replacement by other cations (K and NH$_4$) points up the improvement achieved with the substitution of lithium for the undesirable cations.

Example 2

Several pens were filled with inks containing 52 millimolar of one of the following dyes: Food Black-2 Li2Na2, Food Black-2 Li3Na1, and Food Black-2 Li4. Each pen had 30 orifices, 47 $\mu$m in diameter.

The pens were stored at 25° C. and 50% RH and tested at 3, 12, and 85 days for crusting, annular rings, and wet spreading.

Crusting was defined as the crystallization of the ink around the orifice, leading to misdirection of the drop (partial blockage) or to prevention of drop ejection (full blockage). Annular rings were defined as crystallization of ink around at least half of the orifice, but not causing blockage of that orifice. Annular rings are considered to be a problem, because they may eventually grow to block the nozzle. The results are depicted in Table III, below.

TABLE III.

| Ink | [Na] ppm | [Li] ppm | Day 3 WS | Day 3 C | Day 3 AR | Day 12 WS | Day 12 C | Day 12 AR | Day 85 WS | Day 85 C | Day 85 AR |
|-----|----------|----------|----|---|----|----|---|----|----|---|----|
| FB2Li2Na2 | 2386 | 746 | 0 | 87 | 99 | | | | 0 | 79 | 123 |
| FB2Li3Na1 | 1109 | 1086 | 0 | 0 | 47 | 0 | 12 | 38 | 0 | 30 | 41 |
| FB2Li4 | 218 | 1430 | 1 | 0 | 8 | 0 | 0 | 8 | 0 | 0 | 12 |

Notes:
WS = # of pens (12 total) with wet spreading
C = # of nozzles with crusting
AR = # of nozzles with annular rings A plot of the foregoing data reveals that up to about 500 ppm of sodium cations may be tolerated without adversely affecting crusting. However, greater than about 500 ppm of sodium results in crusting of orifices, leading to partial or full blockage of the orifices. Crusting is substantially completely eliminated by maintaining the concentration of sodium ions below about 350 ppm.

Example 3

A similar test was performed as in Example 2, but filling pens with the following dyes: Food Black-2 Na4 (12 pens) and Food Black-2 Li4 (11 pens). The pens were tested at 1, 4, 6, 11, and 14 days for crusting and annular rings. The results are depicted in Table IV, below.

TABLE IV.

| Ink | [Na] ppm | [Li] ppm | Day 1 C | Day 1 AR | Day 4 C | Day 4 AR | Day 6 C | Day 6 AR | Day 11 C | Day 11 AR | Day 14 C | Day 14 AR |
|-----|----------|----------|---|----|----|---|----|---|----|----|----|----|
| FB2Na4 | 4800 | 0 | 5 | 28 | 66 | 6 | 89 | 7 | 74 | 38 | 94 | 25 |
| FB2Li4 | 218 | 1430 | 0 | 0 | 0 | 0 | 0 | 0 | 0 | 0 | 0 | 0 |

The superiority of inks containing substantially complete replacement of sodium ions by lithium ions is evident.

Example 4—Black Ink

A composition comprising 5.5 wt. % diethylene glycol (DEG), 2.3 wt % lithium-substituted Food Black 2 dye (at least about 75% substitution of Na.), 0.01 wt % ICI Proxel CRL biocide, 0.08 wt % sodium borate, and the balance deionized water was prepared. This ink produced laser printer quality print having a dry time of less than 20 seconds and the ability to remain in an uncapped pen for a minimum of 20 days without crusting. No bacterial growth was observed in the ink.

Example 5—Magenta Ink

A composition comprising 5.5 wt. % DEG, 2 wt % Direct Red 227 dye, 0.3 wt % Nuodex Co. Nuosept 95 biocide, 0.08 wt % sodium borate, and the balance deionized water was prepared. This ink gave the same results as observed in Example 4.

Example 6—Cyan Ink

A composition comprising 5.5 wt. % DEG, 2 wt % Direct Blue 199 dye, 0.3 wt % Nuodex Co. Nuosept 95 biocide, 0.08 wt % sodium borate, and the balance deionized water was prepared. This ink gave the same results as observed in Example 4.

Example 7—Yellow Ink

A composition comprising 5.5 wt. % DEG, 1 wt % Direct Yellow 86 dye, 0.3 wt % Nuodex Co. Nuosept 95 biocide, 0.08 wt % sodium borate, and the balance deionized water was prepared. This ink gave the same results as observed in Example 4.

Example 8—Black Ink

A composition comprising 10 wt. % DEG, 2.3 wt % lithium-substituted Food Black 2 dye, 0.08 wt % sodium borate, and the balance deionized water was prepared. This ink produced laser quality print on bond papers and good (letter quality print on most photocopy paper. Bacterial growth was observed in the ink after storage.

Example 9—Black Ink

For comparison, a composition comprising 12 wt. % DEG, 2.3 wt % lithium-substituted Food Black 2 dye, 0.08 wt % sodium borate, and the balance deionized water was prepared. This ink produced laser quality print on bond papers and unacceptable (less than letter quality) print on photocopy paper.

Example 10—Black Ink

For comparison, a composition comprising 15 wt. % DEG, 2.3 wt % lithium-substituted Food Black 2 dye, 0.08 wt % sodium borate, and the balance deionized water was prepared. This ink produced good (letter quality) print on bond papers and unacceptable (less than letter quality) print on photocopy paper. The dry time was slower than that of inks containing lower amounts of DEG.

Example 11—Black Ink

For comparison, a composition comprising 50 wt. % DEG, 2.3 wt % lithium-substituted Food Black 2 dye, 0.08 wt % sodium borate, and the balance deionized water was prepared. This ink produced unacceptable (less than letter quality) print on most media, except custom-coated paper.

Thus, an ink composition for ink-jet printers has been provided. The ink comprises an anionic dye in which at least a portion of the associated cations are replaced with lithium cations. Various changes and modifications will be readily apparent to those of ordinary skill in the art, and all such changes and modifications are considered to be within the scope of this invention.

What is claimed is:

1. A thermal ink-jet composition suitable for use in ink-jet printers comprising:
   (a) a vehicle comprising about 5 to 10% at least one member selected from the group consisting of glycols ethers and the balance water; and
   (b) a dye having at least one negatively charged functional group per molecule, present in an amount up to about 0.1 Molar of the vehicle composition, said dye having a plurality of anionic sites, originally associated with undesirable cations, substantially all of said cations being replaced with lithium cations, said ink containing less than about 500 ppm of said undesirable cations.

2. The ink composition of claim 1 wherein said undesirable cations are selected from the group consisting of sodium and potassium cations.

3. The ink composition of claim 1 wherein said member is selected from the group consisting of diethylene glycol, triethylene glycol and polyethylene glycols.

4. The ink composition of claim 3 wherein said vehicle consists essentially of diethylene glycol, present in an amount of about 5.5%, and the balance water.

5. The ink composition of claim 1 wherein said dye includes at least one functional group per molecule selected from the group consisting of sulfonate and carboxylate groups.

6. The ink composition of claim 1 containing less than about 350 ppm of sodium cations.

7. A thermal ink-jet composition suitable for use in thermal ink-jet printers comprising:
   (a) a vehicle comprising about 5% to less than about 10% of at least one member selected from the group consisting of glycols and glycol ethers and the balance water; and
   (b) a dye having at least one negatively charged functional group per molecule selected from the group consisting of sulfonate and carboxylate groups, said dye present in an amount up to about 0.1 Molar of the vehicle composition, said dye having a plurality of anionic sites, originally associated with sodium catations, substantially all of said sodium cations being replaced with lithium cations, said ink containing less than about 500 ppm of said sodium cations.

8. The ink composition of claim 7 wherein said member is selected from the group consisting of diethylene glycol, triethylene glycol and polyethylene glycols.

9. The ink composition of claim 8 wherein said vehicle consists essentially of diethylene glycol, present in an amount of about 5.5%, and the balance water.

10. The ink composition of claim 8 containing less than about 350 ppm of sodium cations.

11. A process for increasing dye solubility without adversely affecting kogation in a thermal ink-jet ink comprising a vehicle and a dye, said vehicle comprising about 5 to 10% of at least one member selected from the group consisting of glycols and glycol ethers and the balance water and said dye having at least one negatively charged functional group per molecule, said dye being present in an amount up to about 0.1 Molar of the vehicle composition and having a plurality of anionic sites originally associated with undesirable cations, said process comprising replacing substantially all of said undesirable cations with lithium cations and removing substantially all of said undesirable cations to provide said ink containing less than about 500 ppm of said undesirable cations.

12. The process of claim 11 wherein said undesirable cations are selected from the group consisting of sodium and potassium cations.

13. The process of claim 11 wherein said member is selected from the group consisting of diethylene glycol, triethylene glycol and polyethylene glycols.

14. The process of claim 13 wherein said vehicle consists essentially of diethylene glycol, present in an amount of 5.5%, and the balance water.

15. The process of claim 12 wherein said dye includes at least one functional group per molecule selected from the group consisting of sulfonate and coaroxylate groups.

16. The process of claim 12 wherein said ink following said replacing and said removal contains less than about 350 ppm of undesirable cations.

17. A process for increasing dye solubility without adversely affecting kogation in a thermal ink-jet ink comprising a vehicle and a dye, said vehicle comprising about 5% to less than about 10% of at least one member selected from the group consisting of glycols and glycol ethers and the balance water and said dye having at least one negatively charged functional group per molecule selected from the group consisting of sulfonate and carboxylate groups, said dye present in an amount up to about 0.1 Molar of the vehicle composition, said dye having a plurality of anionic sites, originally associated with sodium cations, said process comprising replacing substantially all of said sodium cations with lithium cations and removing substantially all of said sodium cations to provide said ink containing less than about 500 ppm of said sodium cations.

18. The process of claim 17 wherein said member is selected from the group consisting of diethylene glycol, triethylene glycol and polyethylene glycols.

19. The process of claim 18 wherein said vehicle consists essentially of diethylene glycol, present in an amount of about 5.5%, and the balance water.

20. The process of claim 17 wherein said ink following said replacing and said removal contains less than about 350 ppm of sodium cations.

* * * * *